United States Patent
Satou

(10) Patent No.: US 11,764,870 B2
(45) Date of Patent: *Sep. 19, 2023

(54) OPTICAL SIGNAL MONITOR, OPTICAL WAVELENGTH MULTIPLEXING TRANSMITTER, AND METHOD FOR MONITORING OPTICAL SIGNAL

(71) Applicant: NEC Corporation, Tokyo (JP)

(72) Inventor: Yoshirou Satou, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/526,052

(22) Filed: Nov. 15, 2021

(65) Prior Publication Data

US 2022/0077925 A1 Mar. 10, 2022

Related U.S. Application Data

(63) Continuation of application No. 17/032,992, filed on Sep. 25, 2020, now Pat. No. 11,206,080, which is a
(Continued)

(30) Foreign Application Priority Data

Mar. 4, 2015 (JP) .................. 2015-042535

(51) Int. Cl.
*H04B 10/079* (2013.01)
*H04B 10/075* (2013.01)
(Continued)

(52) U.S. Cl.
CPC ....... *H04B 10/0795* (2013.01); *H04B 10/075* (2013.01); *H04B 10/07955* (2013.01);
(Continued)

(58) Field of Classification Search
CPC .............. H04B 10/075; H04B 10/0795; H04B 10/07955; H04B 10/572; H04J 14/00; H04J 14/02; H04J 14/0221; H04J 14/026
(Continued)

(56) References Cited

U.S. PATENT DOCUMENTS 6,441,933 B1 8/2002 Jang ........................ H04J 14/02
398/79
6,907,201 B1 6/2005 Frankel
(Continued)

FOREIGN PATENT DOCUMENTS

CN 1490970 A 4/2004
CN 103155461 A 6/2013
(Continued)

OTHER PUBLICATIONS

Communication dated Apr. 19, 2018 from U.S. Patent & Trademark Office in counterpart U.S. Appl. No. 15/551,810.
(Continued)

*Primary Examiner* — Dalzid E Singh
(74) *Attorney, Agent, or Firm* — Sughrue Mion, PLLC

(57) ABSTRACT

An optical signal monitor, including: a storage that holds a threshold value set for each of determination areas having a bandwidth set in accordance with an average grid of dummy light; a measurement section that sequentially measures an optical intensity of an inputted wavelength-multiplexed optical signal with respect to each of measurement areas obtained by dividing the determination area into areas with a bandwidth sufficiently smaller than a grid width of a monitoring-target optical signal composing the wavelength-multiplexed optical signal, and output measured values; and a section that determines that dummy light corresponding to the determination area needs introducing if each of measured values in the determination area is smaller than a
(Continued)

threshold value, and, determines that dummy light corresponding to the determination area does not need introducing if at least one of the measured values in the determination area is equal to or larger than the threshold value.

12 Claims, 13 Drawing Sheets

Related U.S. Application Data continuation of application No. 16/440,002, filed on Jun. 13, 2019, now Pat. No. 10,805,003, which is a continuation of application No. 16/039,739, filed on Jul. 19, 2018, now Pat. No. 10,404,366, which is a continuation of application No. 15/551,810, filed as application No. PCT/JP2016/001102 on Mar. 1, 2016, now Pat. No. 10,056,976.

(51) Int. Cl.
  *H04J 14/00* (2006.01)
  *H04J 14/02* (2006.01)
  *H04B 10/572* (2013.01)
(52) U.S. Cl.
  CPC .......... *H04B 10/572* (2013.01); *H04J 14/00* (2013.01); *H04J 14/02* (2013.01); *H04J 14/026* (2013.01); *H04J 14/0221* (2013.01)
(58) Field of Classification Search
  USPC ............................................................ 398/9
  See application file for complete search history.

(56) References Cited

U.S. PATENT DOCUMENTS

| | | | | |
|---|---|---|---|---|
| 7,136,593 | B1 | 11/2006 | Yano | |
| 9,219,565 | B2* | 12/2015 | Kaneko | H04B 10/506 |
| 10,056,976 | B2* | 8/2018 | Satou | H04B 10/07955 |
| 10,404,366 | B2* | 9/2019 | Satou | H04J 14/02 |
| 10,805,003 | B2* | 10/2020 | Satou | H04J 14/02 |
| 11,206,080 | B2* | 12/2021 | Satou | H04B 10/0795 |
| 2002/0015202 | A1 | 2/2002 | Michishita et al. | |
| 2006/0304820 | | 12/2006 | Sato | |
| 2007/0230968 | A1 | 10/2007 | Shimizu | |
| 2008/0304829 | A1* | 12/2008 | Sato | H04J 14/0221 |
| | | | | 398/79 |
| 2009/0317078 | A1* | 12/2009 | Uda | H04B 10/25133 |
| | | | | 398/136 |
| 2011/0081146 | A1 | 4/2011 | Nakajima et al. | |
| 2013/0058647 | A1 | 3/2013 | Boertjes et al. | |
| 2014/0105598 | A1 | 4/2014 | Lucamarini et al. | |
| 2014/0286635 | A1 | 9/2014 | Kaneko et al. | |
| 2016/0112141 | A1 | 4/2016 | Rahn | H04J 14/0256 |
| | | | | 398/79 |

FOREIGN PATENT DOCUMENTS

| | | | |
|---|---|---|---|
| CN | 103493413 | A | 1/2014 |
| JP | 2002-51013 | A | 2/2002 |
| JP | 2002-198912 | A | 7/2002 |
| JP | 2005-051598 | A | 2/2005 |
| JP | 2007-012767 | A | 1/2007 |
| JP | 2007-274482 | A | 10/2007 |
| JP | 2008-308877 | A | 12/2008 |
| JP | 2012-109653 | A | 6/2012 |
| JP | 2013-070123 | A | 4/2013 |
| JP | 2013-541301 | A | 11/2013 |
| JP | 2014-165751 | A | 9/2014 |
| JP | 2014-187671 | A | 10/2014 |
| WO | 2012051260 | A1 | 4/2012 |

OTHER PUBLICATIONS

Communication dated Apr. 3, 2019, from the State Intellectual Property Office of the P.R.C in counterpart application No. 201680013597.0.
Communication dated Jul. 2, 2019 from the Japanese Patent Office in counterpart Application No. 2018-122125.
Communication dated May 29, 2018 from the Japanese Patent Office in counterpart application No. 2017-503346.
Communication dated Nov. 6, 2019, from the State Intellectual Property Office of the P.R.C in application No. 201680013597.0.
Communication dated Sep. 26, 2018, from European Patent Office in counterpart application No. 18756631.2.
International Search Report for PCT/JP2016/001102 dated Apr. 26, 2016 [PCT/ISA/210].
Written Opinion for PCT/JP2016/001102 dated Apr. 26, 2016 [PCT/ISA/237].
Notice of Allowance dated Mar. 13, 2019 in counterpart U.S. Appl. No. 16/039,739.
Japanese Office Action for JP Application No. 2020-097374 dated May 11, 2021 with English Translation.
Chinese Office Action for CN Application No. 202010053012.6 dated Jun. 8, 2021 with English Translation.
Japanese Office Communication for JP Application No. 2020-097374 dated Nov. 24, 2021 with English Translation.
JP Office Action for JP Application No. 2021-205673, dated Dec. 20, 2022 with English Translation.

* cited by examiner

OPTICAL SIGNAL MONITOR, OPTICAL WAVELENGTH MULTIPLEXING TRANSMITTER, AND METHOD FOR MONITORING OPTICAL SIGNAL

CROSS REFERENCE TO RELATED APPLICATIONS

This application is a Continuation of U.S. application Ser. No. 17/032,992, filed Sep. 25, 2020, which is a Continuation of U.S. application Ser. No. 16/440,002, filed Jun. 13, 2019, and issued as U.S. Pat. No. 10,805,003, which is a Continuation of U.S. application Ser. No. 16/039,739, filed on Jul. 19, 2018, and issued as U.S. Pat. No. 10,404,366, which is a Continuation of Ser. No. 15/551,810, filed on Aug. 17, 2017, and issued as U.S. Pat. No. 10,056,976, which is a National stage of International Application No. PCT/JP2016/001102 filed on Mar. 1, 2016, which claims priority benefit from Japanese Patent Application 2015-042535 filed on Mar. 4, 2015, the contents of all of which are incorporated herein by reference.

TECHNICAL FIELD

The present invention relates to optical signal monitors, optical wavelength multiplexing transmitters, and an methods for monitoring optical signal and, in particular, to an optical signal monitor, an optical wavelength multiplexing transmitter, and a method for monitoring optical signal that process a wavelength-multiplexed optical signal composed of optical signals in which a plurality of frequency grids are mixed.

BACKGROUND ART

Recently, services to handle large-capacity contents such as a video have been rapidly expanded because of the growth of the Internet and the like. This leads to a growing demand for a large-capacity backbone network; consequently, it becomes important to use a finite optical spectral region more efficiently. One of technologies to use an optical spectral region efficiently is a wavelength division multiplexing (WDM) transmission system. In the WDM system, a plurality of signal light beams with their center wavelengths different from each other are combined, amplified to a desired level in an optical amplifier, and then output to an optical fiber transmission line.

In general, an optical amplifier has a wavelength-dependent gain, and particularly, the wavelength dependence prominently arises if an input level of an optical signal is reduced. In this case, an output level of an optical signal becomes dependent on wavelength. Patent Literature 1 discloses a technology to maintain a constant gain of an optical amplifier by disposing a correction light source and, if the number of optical signals composing a WDM signal decreases, by introducing correction light into the WDM signal instead. FIG. 11A illustrates an example of an output level without correction light introduced, and FIG. 11B illustrates an example of an output level with correction light introduced, if the number of optical signals decreases.

In FIG. 11A and FIG. 11B, if optical signals of wavelengths $\lambda 3$ to $\lambda 7$ are lost, the wavelength dependence of the gain of an optical amplifier prominently arises if the correction light is not introduced, and output levels of main signal light with $\lambda 1$, $\lambda 2$, and $\lambda 8$ becomes dependent on wavelength. In contrast, the gain of the optical amplifier can be flattened by introducing correction light with $\lambda a$ to $\lambda c$ corresponding to the lost optical signals with the wavelengths $\lambda 3$ to $\alpha 7$; consequently, the output levels of main signal light with $\lambda 1$, $\lambda 2$, and $\lambda 8$ become unaffected by the gain.

CITATION LIST

Patent Literature

[PTL 1] Japanese Patent Application Laid-Open Publication No. 2007-12767

SUMMARY OF INVENTION

Technical Problem

In order to use an optical spectral region more effectively, it is proposed to optimize frequency grids of optical signals in accordance with transmission technologies such as a transmission rate and a modulation method. The technology disclosed in Patent Literature 1 cannot deal with a situation where a plurality of optical signals are lost each of which has a different frequency grid because the technology does not make the assumption that a WDM signal is composed of optical signals in which a plurality of frequency grids are mixed.

The present invention has been made in view of the above-described problem, and it is an object of the present invention to provide an optical signal monitor, an optical wavelength multiplexing transmitter, and an method for monitoring optical signal that can make a judgment of necessity to introduce dummy light having a highly accurate grasp of a change in an input level influencing a gain even though a wavelength-multiplexed optical signal is composed of optical signals in which a plurality of frequency grids are mixed.

Solution to Problem

In order to achieve the above-described object, an optical signal monitor according to an exemplary aspect of the present invention includes a storage means for holding a threshold value i (i=1 to N) set for each of N determination areas i (i=1 to N) having a bandwidth n set in accordance with an average grid of dummy light; a measurement means for sequentially measuring an optical intensity of an inputted wavelength-multiplexed optical signal with respect to each of measurement areas 1 to M obtained by dividing the determination area i into M areas with a bandwidth m (M=n/m) sufficiently smaller than a grid width of a monitoring-target optical signal composing the wavelength-multiplexed optical signal, and outputting M×N measured values; and a determination means for determining that dummy light corresponding to the determination area i needs introducing if each of M measured values in the determination area i is smaller than a threshold value i, and, determining that dummy light corresponding to the determination area i does not need introducing if at least one of the M measured values in the determination area i is equal to or larger than the threshold value i.

In order to achieve the above-described object, an optical wavelength multiplexing transmitter according to an exemplary aspect of the present invention includes a plurality of optical output means for outputting optical signals with wavelengths differing from each other having a plurality of grids; a wavelength multiplex means for wavelength-multiplexing the optical signals output from the plurality of optical output means, and outputting a wavelength-multiplexed optical signal; an optical splitting means for splitting the wavelength-multiplexed optical signal having output into two signals, and outputting split wavelength-multiplexed optical signals; the above-described optical signal monitor configured to receive input of one of the split wavelength-multiplexed optical signals and make a judgment of necessity to introduce dummy light into a corresponding determination area i based on an optical intensity of the one of the split wavelength-multiplexed optical signals; a dummy light source configured to output dummy light corresponding to the determination area i based on the judgment; and an optical coupling means for coupling another of the split wavelength-multiplexed optical signals with the dummy light having output and outputting a transmission signal.

In order to achieve the above-described object, an method for monitoring optical signal according to an exemplary aspect of the present invention, using a threshold value i (i=1 to N) set for each of N determination areas i (i=1 to N) having a bandwidth n set in accordance with an average grid of dummy light, includes measuring sequentially an optical intensity of an inputted wavelength-multiplexed optical signal with respect to each of measurement areas 1 to M obtained by dividing the determination area i into M areas with a bandwidth m (M=n/m) sufficiently smaller than a grid width of a monitoring-target optical signal composing the wavelength-multiplexed optical signal, and outputting M×N measured values; and determining that dummy light corresponding to the determination area i needs introducing if each of M measured values in the determination area i is smaller than a threshold value i, and, determining that dummy light corresponding to the determination area i does not need introducing if at least one of the M measured values in the determination area i is equal to or larger than the threshold value i.

Advantageous Effects of Invention

According to the above-mentioned aspects of the present invention, it is possible to make a judgment of necessity to introduce dummy light having a highly accurate grasp of a change in an input level influencing a gain even though a wavelength-multiplexed optical signal is composed of optical signals in which a plurality of frequency grids are mixed.

BRIEF DESCRIPTION OF DRAWINGS

FIG. 11B is a diagram illustrating an output level with introducing correction light if optical signals of wavelengths $\lambda 3$ to $\lambda 7$ are lost in Patent Literature 1.

EXAMPLE EMBODIMENT

Figure 1A:
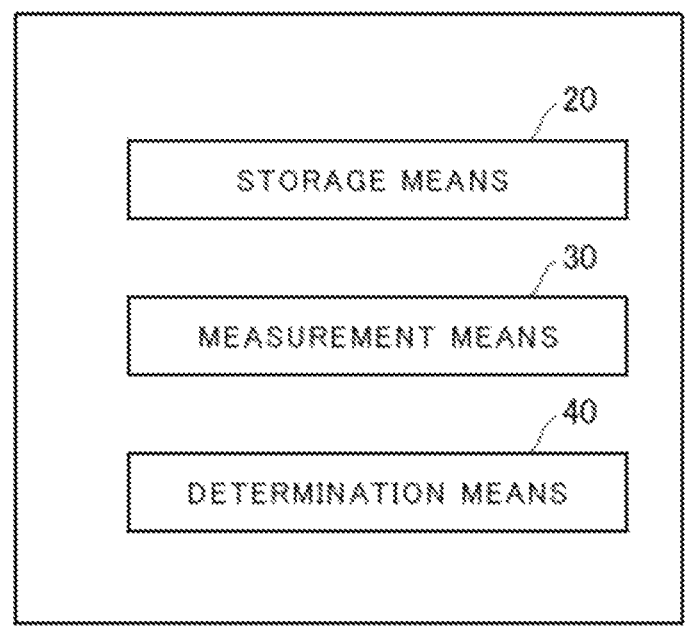
FIG. 1A is a block configuration diagram of an optical signal monitor 10 according to a first example embodiment.

Example embodiments of the present invention will be described in detail below with reference to the drawings. The directions of the arrows in the drawings represent one example, and do not limit directions of signals between blocks.

First Example Embodiment

A first example embodiment of the present invention will be described. FIG. 1A is a block configuration diagram of an optical signal monitor according to the present example embodiment. In FIG. 1A, an optical signal monitor 10 includes storage means 20, measurement means 30, and determination means 40.

Figure 1B:
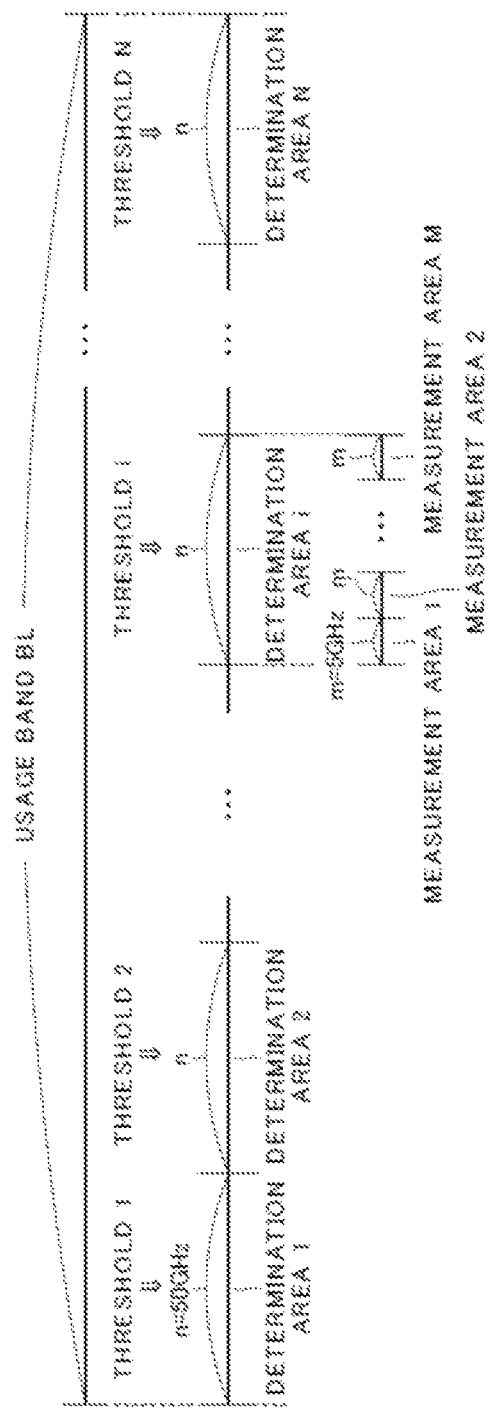
FIG. 1B is a diagram to illustrate the operation of the optical signal monitor 10 according to the first example embodiment.

The storage means 20 holds a threshold value i (i=1 to N) set for each of N determination areas i (i=1 to N) having a bandwidth n set in accordance with an average grid of dummy light. As illustrated in FIG. 1B, the determination areas 1 to N are obtained by dividing a usage band BL of optical signals that the optical signal monitor 10 monitors into N areas with respect to each bandwidth n (50 GHz, for example) corresponding to an average grid (50 GHz, for example) of dummy light introduced when an optical signal is lost.

The measurement means 30 divides the bandwidth n in the determination area i into M areas with respect to each bandwidth m that is sufficiently smaller than a grid width of a monitoring-target optical signal (here, m=n/M), and sets M measurement areas 1 to M. That is to say, as illustrated in FIG. 1B, the measurement areas 1 to M are obtained by dividing the bandwidth n (50 GHz, for example) in the determination area i into M areas by the bandwidth m (5 GHz, for example) that is equal to or smaller than one third of the grid width of the monitoring-target optical signal. The measurement means 30 sequentially measures an optical intensity of an inputted wavelength-multiplexed optical signal (a signal in which the monitoring-target optical signals are wavelength-multiplexed) in the measurement areas 1 to M of all the determination areas 1 to N, and outputs M×N measured values.

If each of M measured values in the determination area i is smaller than a threshold value i, the determination means 40 determines that dummy light corresponding to the determination area i needs introducing. In contrast, if at least one of the M measured values in the determination area i is equal to or larger than the threshold value i, the determination means 40 determines that dummy light corresponding to the determination area i does not need introducing.

As described above, the optical signal monitor 10 according to the present example embodiment sets the determination areas 1 to N corresponding to the average grid of the dummy light, and determines an optical intensity of a wavelength-multiplexed optical signal with respect to each of the measurement areas 1 to M into which the determination area is finely divided in accordance with the grid width of the monitoring-target optical signals. In this case, it is possible to make a judgment of necessity to introduce dummy light properly having a highly accurate grasp of a change in an input level influencing a gain even though the wavelength-multiplexed optical signal is composed of optical signals in which a plurality of frequency grids are mixed.

Second Example Embodiment

Figure 2:
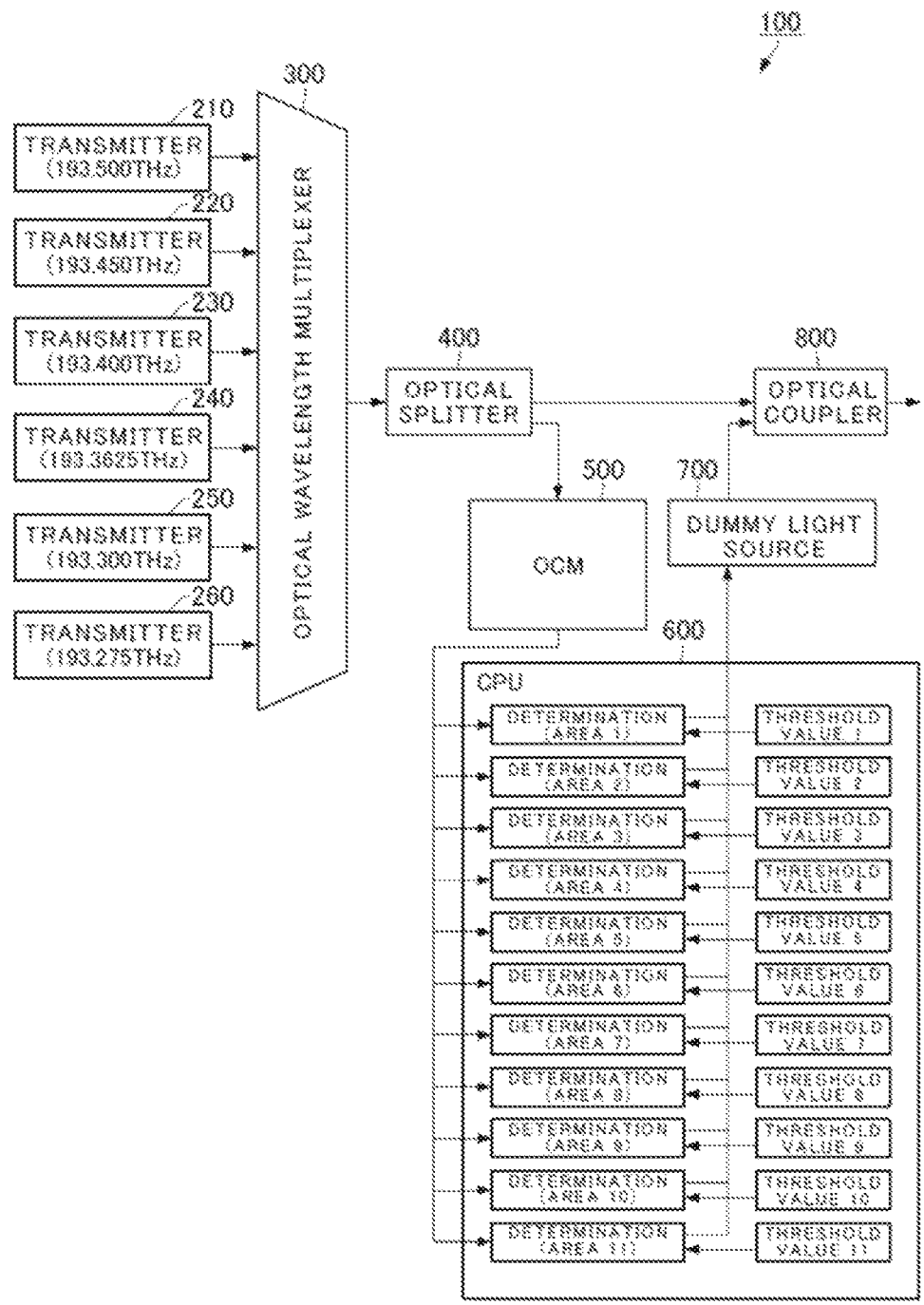
FIG. 2 is a block configuration diagram of a wavelength multiplexing transmitter 100 according to a second example embodiment.

A second example embodiment will be described. FIG. 2 is a block configuration diagram of a wavelength multiplexing transmitter according to the present example embodiment. In FIG. 2, a wavelength multiplexing transmitter 100 includes six transmitters 210 to 260, an optical wavelength multiplexer 300, an optical splitter 400, an optical channel monitor (OCM) 500, a CPU 600, a dummy light source 700, and an optical coupler 800.

Figure 3:
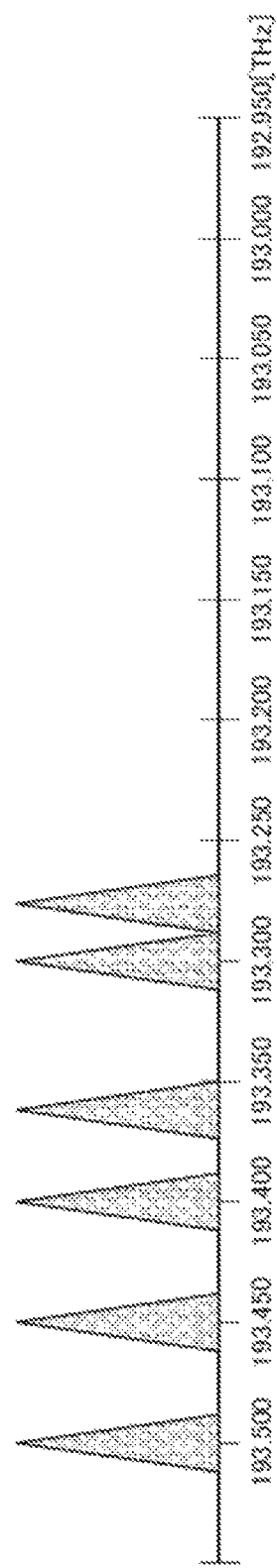
FIG. 3 is an example of optical signals output from transmitters 210 to 260 according to the second example embodiment.

Each of the transmitters 210 to 260 generates an optical signal having a predetermined bandwidth with a center frequency within an optical signal usage band ranging from 193.525 THz to 192.975 THz that differs from each other. For example, the transmitters 210 to 260 generate optical signals having a bandwidth of 50 GHz with their center frequencies equal to 193.500, 193.450, 193.400, 193.3625, 193.300, and 193.275 THz, respectively. FIG. 3 illustrates one example of optical signals output from the transmitters 210 to 260. As illustrated in FIG. 3, the transmitters 210 and 220 generate optical signals having a grid of 50 GHz, the transmitters 230 and 240 generate optical signals having a grid of 37.5 GHz, and the transmitters 250 and 260 generate optical signals having a grid of 25 GHz.

The optical wavelength multiplexer 300 wavelength-multiplexes the optical signals respectively output from the transmitters 210 to 260 and outputs a WDM signal. As mentioned above, different frequency grids are mixed in the WDM signal output from the optical wavelength multiplexer 300. It is possible to use, as the optical wavelength multiplexer 300, an arrayed waveguide grating (AWG) module, an optical coupler, an interleaver, a wavelength selective switch (WSS), or a device configuration obtained by combining those devices.

The optical splitter 400 splits the WDM signal output from the optical wavelength multiplexer 300, outputs one of the WDM signal to the optical coupler 800, and outputs the other of the WDM signal to the OCM 500. The optical splitter 400 according to the present example embodiment splits the WDM signal in the splitting ratio of approximately nine to one, and outputs the former to the optical coupler 800, the latter to the OCM 500.

Figure 4:
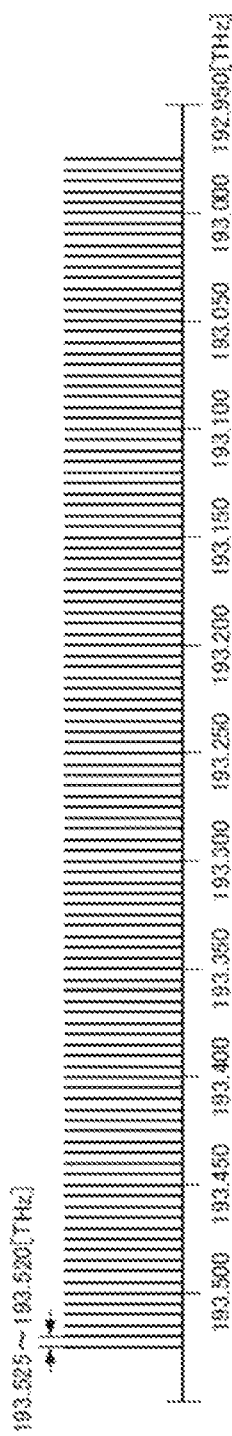
FIG. 4 is an example of measurement steps of an OCM 500 according to the second example embodiment.

The OCM 500 continuously, periodically measures the optical power of the WDM signal inputted from the optical splitter 400 at a frequency spacing that is sufficiently smaller than the frequency grid of the optical signal outputs from the transmitters 210 to 260. The OCM 500 according to the present example embodiment performs sampling measurement on the optical power of the WDM signal at 5 GHz steps for the frequency grids of the transmitters 210 to 260 (50 GHz grid, 37.5 GHz grid, and 25 GHz grid). FIG. 4 illustrates the measurement steps of the OCM 500 according to the present example embodiment.

In FIG. 4, the OCM 500 measures the optical power of the inputted WDM signal in 5 GHz basis for the measurement band ranging from 193.525 THz to 192.975 THz. Specifically, the OCM 500 first measures the optical power of the WDM signal ranging from 193.525 THz to 193.520 THz, subsequently measures the optical power of the WDM signal ranging from 193.520 THz to 193.515 THz, and sequentially measures the optical power of the WDM signal with respect to each 5 GHz up to 192.975 THz. The OCM 500 outputs, to the CPU 600, measurement results of the optical power of the WDM signal for each 5 GHz (referred to as an optical power measured value below).

If it is intended to detect the presence or absence of the optical signal more finely, it is also possible to measure it by a step smaller than 5 GHz step. In contrast, if it is intended to decrease the number of times of the measurement, it is possible to use 10 GHz step or the like, for example, and set a larger step so that three or more optical power measured values can be obtained within each area descried below.

Figure 5:
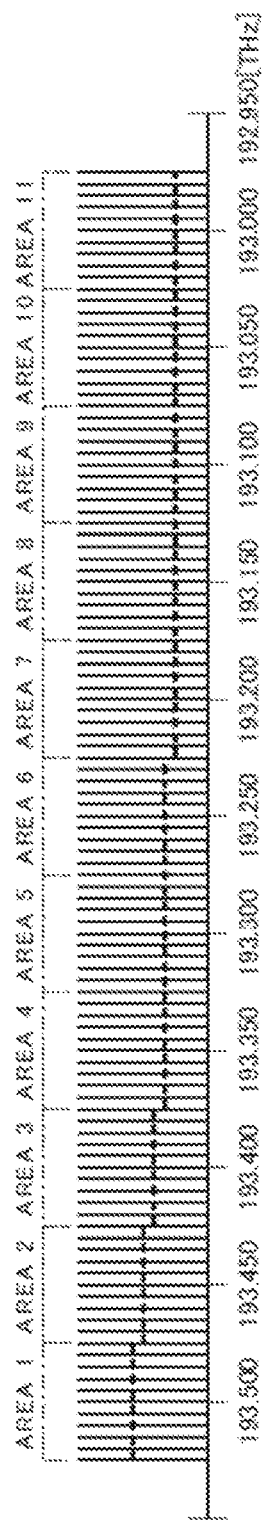
FIG. 5 is an example of threshold values 1 to 11 and areas 1 to 11 set by a CPU 600 according to the second example embodiment.

The CPU 600 determines whether or not the optical signals generated in the transmitters 210 to 260 are included in the WDM signal, and introduces dummy light if the optical signals are not included. Here, the CPU 600 divides the measurement band of the optical signal ranging from 193.525 THz to 192.975 THz with respect to each average grid of the dummy light to be introduced into the WDM signal, by which the CPU sets a plurality of areas having the same bandwidth. In the present example embodiment, since the dummy light source 700 described below outputs the dummy light with 50 GHz grid, the CPU 600 divides the measurement band ranging from 193.525 THz to 192.975 THz with respect to each 50 GHz from the larger frequency side, and sets eleven areas 1 to 11. The set areas 1 to 11 are illustrated in FIG. 5. The CPU 600 holds threshold values 1 to 11 for the areas 1 to 11, and makes a judgment of necessity to introduce a dummy signal by comparing the optical power measured value inputted from the OCM 500 with the corresponding threshold value. FIG. 5 illustrates an example of the threshold values with a dotted line. In the present example embodiment, the threshold value is set at the same value in each of the areas 4 to 6, and in each of the areas 7 to 11.

The CPU 600 according to the present example embodiment compares ten optical power measured values by 5 GHz step within the area 1 (from 193.525 THz to 193.475 THz) with the threshold value 1 set for the area 1, respectively. If at least one of the ten optical power measured values within the area 1 is equal to or larger than the threshold value 1, the CPU 600 determines that the dummy light does not need introducing into the area 1. In this case, for example, the CPU 600 turns off a switch 741 in the dummy light source 700 described below, and blocks the output of the dummy light corresponding to the area 1. In contrast, if each of the ten optical power measured values within the area 1 is smaller than the threshold value 1, the CPU 600 determines that the dummy light needs introducing into the area 1. In this case, the CPU 600 turns on the switch 741 in the dummy light source 700, and causes the dummy light corresponding to the area 1 to be introduced into the WDM signal.

Figure 6:
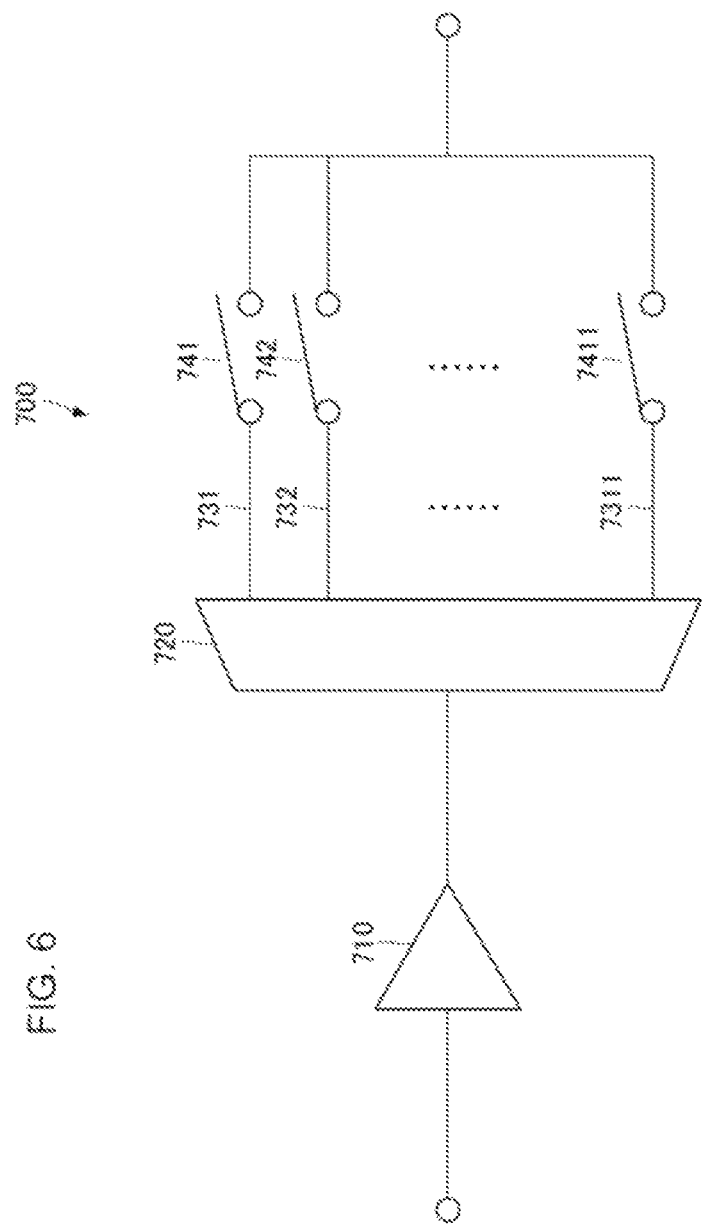
FIG. 6 is a circuit configuration diagram of a dummy light source 700 according to the second example embodiment.

The dummy light source 700 generates and outputs the dummy light corresponding to each of the areas 1 to 11. FIG. 6 illustrates an example of a circuit configuration diagram of the dummy light source 700. The dummy light source 700 in FIG. 6 is configured by an optical amplifier 710, an optical demultiplexer 720, eleven pieces of output waveguides 731 to 7311, and switches 741 to 7411. The amplified spontaneous emission (ASE) light amplified at the optical amplifier 710 is demultiplexed in the optical demultiplexer 720 into the dummy light with the bands corresponding to the areas 1 to 11, and is output to the output waveguides 731 to 7311 respectively. The switches 741 to 7411 are disposed respectively in the output waveguides 731 to 7311, and controlled by the CPU 600 so that the dummy light inputted into the output waveguide in which the switch is turned on may be output to the optical coupler 800. An AWG module or the like can be used as the optical demultiplexer 720.

Figure 7:
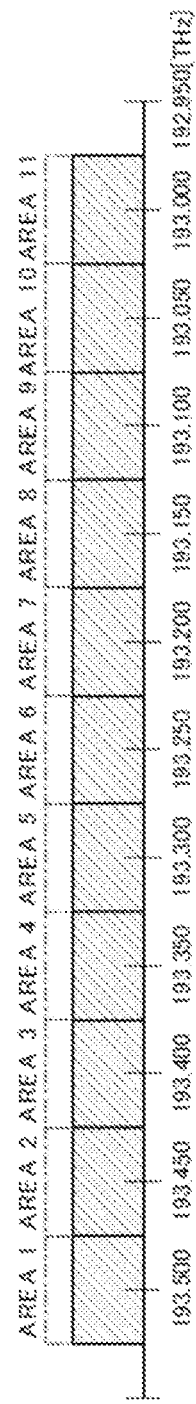
FIG. 7 is an example of a power spectrum of dummy light output from the dummy light source 700 according to the second example embodiment.

FIG. 7 illustrates a power spectrum of the dummy light inputted into the optical coupler 800 when all the switches 741 to 7411 are turned on by the CPU 600. As illustrated in FIG. 7, in the present example embodiment, the dummy light beams are inputted into the optical coupler 800, each of which has a rectangular waveform that has a bandwidth of 50 GHz with the center frequency positioned at the 50 GHz grid (193.500 THz, 193.450 THz, . . . and 193.000 THz).

The optical coupler 800 couples the WDM signal inputted from the optical splitter 400 with the dummy light inputted from the dummy light source 700, and outputs the coupled signal as a transmission signal. When a part of the optical signals output from the transmitters 210 to 260 is lost, the dummy light is coupled that corresponds to the area where the optical signal has been lost; consequently, the total power of the transmission signal output from the wavelength multiplexing transmitter 100 is kept approximately constant. It is preferable for a coupling ratio of the optical coupler 800 to be set at approximately one to one between the WDM signal side and the dummy light side.

Figure 8:
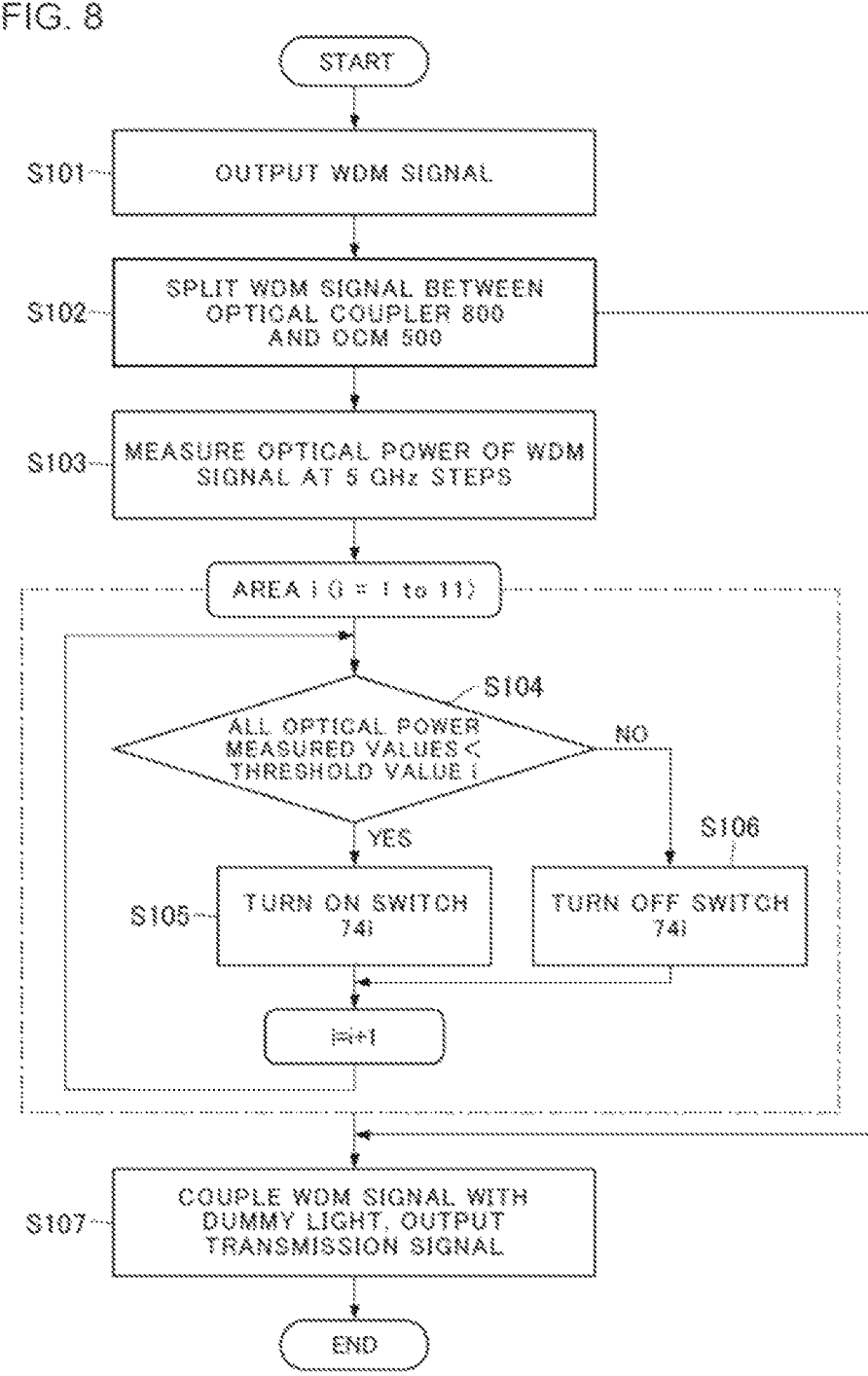
FIG. 8 is an operational flow of the wavelength multiplexing transmitter 100 according to the second example embodiment.
Figure 9:
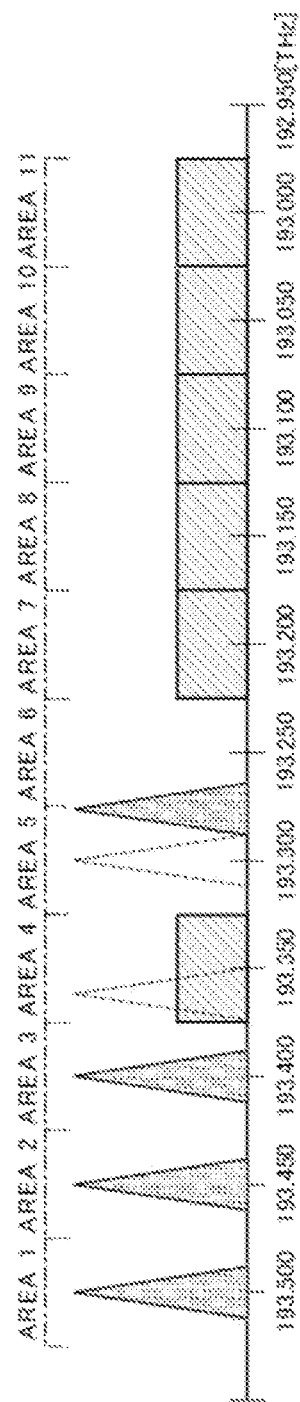
FIG. 9 is an example of a power spectrum of a transmission signal output from an optical coupler 800 according to the second example embodiment.

Next, the operation of the wavelength multiplexing transmitter 100 when optical signals from the transmitters 240 and 250 are lost will be described using FIG. 8 and FIG. 9. FIG. 8 illustrates an operational flow of the wavelength multiplexing transmitter 100, and FIG. 9 illustrates a power spectrum of transmission signals output from the optical coupler 800.

In FIG. 8, the optical wavelength multiplexer 300 in the wavelength multiplexing transmitter 100 wavelength-multiplexes optical signals inputted from the transmitters 210 to 260, and outputs a WDM signal (S101). If the optical signals from the transmitters 240 and 250 are lost, only optical signals output from the transmitters 210 to 230, and 260 are wavelength-multiplexed into the WDM signal. FIG. 9 illustrates, by stippled areas, the power spectrum of the WDM signal output from the optical wavelength multiplexer 300.

The WDM signal output from the optical wavelength multiplexer 300 is split in the ratio of approximately nine to one 9:1 at the optical splitter 400, and then the former is output to the optical coupler 800, and the latter is output to the OCM 500 (S102).

The OCM 500 continuously, periodically measures, at 5 GHz steps, the optical power of the WDM signal inputted from the optical splitter 400, and outputs an optical power measured value to the CPU 600 (S103).

The CPU 600 compares the optical power measured values inputted from the OCM 500 with the corresponding threshold values 1 to 11 with respect to each of the areas 1 to 11 (S104). If all of the ten optical power measured values in the area i are smaller than the corresponding threshold value i (S104/YES), the CPU 600 determines that dummy light needs introducing into the area i, and turns on the switch 74i in the dummy light source 700 corresponding to the area i (S105). In contrast, if at least one of the optical power measured values is equal to or larger than the corresponding threshold value i (S104/NO), the CPU 600 determines that dummy light does not need introducing into the area i, and turns off the switch 74i in the dummy light source 700 corresponding to the area i (S106).

Specifically, if the optical signals from the transmitters 240 and 250 are lost, the CPU 600 determines that dummy light does not need introducing into the area 1 because some of the ten optical power measured values in the area 1 are larger than the threshold value 1. In this case, the CPU 600 turns off the switch 741 corresponding to the area 1 in the dummy light source 700. Similarly, the CPU 600 turns off the switches 742 and 743 corresponding to the areas 2 and 3.

In contrast, because all of the ten optical power measured values in the area 4 are smaller than the threshold value 4, the CPU 600 determines that dummy light needs introducing into the area 4. The CPU 600 then turns on the switch 744 corresponding to the area 4 in the dummy light source 700. This causes the dummy light in the band corresponding to the area 4 to be output from the dummy light source 700 to the optical coupler 800. In FIG. 9, power spectra of the dummy light output from the dummy light source 700 to the optical coupler 800 are illustrated by the shaded areas.

In addition, the CPU 600 compares the ten optical power measured values in the area 5 with the threshold value 5. Because a part of the optical signal from the transmitter 260, besides the optical signal from the transmitter 250 that has been lost, is also included in the area 5, some of the ten optical power measured values in the area 5 become larger than the threshold value 5. In this case, the CPU 600 determines that the dummy light does not need introducing into the area 5, and turns off the switch 745 that corresponds to the area 5. After this, the CPU 600 performs similar operations (introducing or blocking dummy light) for the areas 6 to 11. That is to say, the CPU 600 turns off the switch 746 that corresponds to the area 6, and turns on the switches 747 to 7411 that correspond to the areas 7 to 11.

The optical coupler 800 couples the WDM signal inputted from the optical splitter 400 with the dummy light inputted from the dummy light source 700, and outputs the transmission signal illustrated in FIG. 9 (S107).

As described above, the wavelength multiplexing transmitter 100 according to the present example embodiment sets a plurality of areas that correspond to average grids of the dummy light, and measures the optical power of the WDM signal output from the optical wavelength multiplexer 300 in a bandwidth into which the area is finely divided. If all of measured values in the area are smaller than the threshold value, the dummy light with the band corresponding to the area is introduced into the transmission signal, and the dummy light with the band corresponding to the area is blocked if at least one of measured values in the area is equal to or larger than the threshold value. This makes it possible to make a judgment of necessity to introduce dummy light and to correct the total power of the transmission signal output from the wavelength multiplexing transmitter 100 with a high degree of accuracy, even though optical signals in various frequency grids are included in the WDM signal output from the optical wavelength multiplexer 300.

Figure 10:
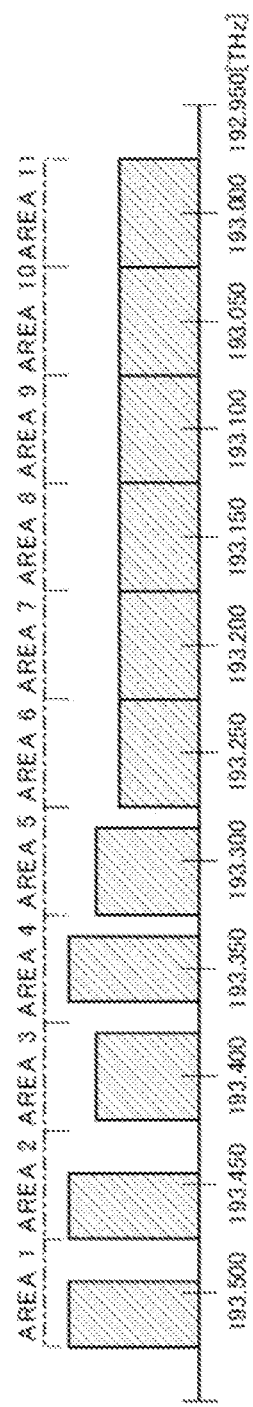
FIG. 10 is an example of a power spectrum of dummy light output from the dummy light source 700 according to the second example embodiment.
Figure 11A:
FIG. 11A is a diagram illustrating an output level without introducing correction light if optical signals of wavelengths $\lambda 3$ to $\lambda 7$ are lost in Patent Literature 1.

In the present example embodiment, the dummy light source 700 generates the dummy light having a rectangular waveform that has a bandwidth of 50 GHz with the center frequency positioned at 50 GHz grid (FIG. 7), to which the present invention is not limited. It is only necessary to have predetermined optical power within the area, and the dummy light as illustrated in FIG. 10 can be used, for example. In FIG. 10, each optical power (square measure) of the dummy light having a rectangular waveform is set so as to become equivalent to the optical power (square measure) of the optical signal output from the transmitter.

If there is a limit to introducing the dummy light, it is not necessarily required to equalize the optical power of the dummy light to the optical power of the optical signal. If the dummy light is forbidden to be introduced because bands on both sides of the optical signal are used as guard bands, for example, the power of the dummy light is slightly increased compared to the power of the optical signal, which enables the total power of the transmission signal to be kept constant.

In the present example embodiment, each band of the areas 1 to 11 is made to correspond to an average grid of the dummy light and constant (50 GHz); however, when the dummy light illustrated in FIG. 10 is used, it is also possible to set a bandwidth of each area arbitrarily and set the center frequency of the area at a value different from the center frequency of the dummy light if it is possible to make the connection between the dummy light and the area. It is not limited for the dummy light to correspond to the area by one-to-one; for example, two areas can be made to correspond to one of dummy light beams.

In addition, because the optical signal from the transmitter 250 and optical signal from the transmitter 260 are included in the area 5 in the present example embodiment, introduction of the dummy light into the area 5 is blocked even though the optical signal from the transmitter 250 is lost. However, for example, if the number of optical power measured values that are equal to or larger than the threshold value 5 is equal to or less than two, a threshold value 5' larger than the threshold value 5 is set, and the two optical power measured values are further compared with the threshold value 5; as a result, the dummy light is introduced into the area 5 if all of the two optical power measured values are smaller than the threshold value 5'.

The present invention has been described above with reference to the above-mentioned example embodiments as typical examples. However, the present invention is not limited to these embodiments. In other words, various forms understandable for those skilled in the art can be applied to the present invention without departing from the scope of the present invention.

REFERENCE SIGNS LIST

10 Optical signal monitor
20 Storage means
30 Measurement means
40 Determination means
100 Wavelength multiplexing transmitter
210 to 260 Transmitter
300 Optical wavelength multiplexer
400 Optical splitter
500 OCM
600 CPU
700 Dummy light source
710 Optical amplifier
720 Optical demultiplexer
731 to 7311 Output waveguide
741 to 7411 Switch
800 Optical coupler

What is claimed is:

1. An optical signal control apparatus, comprising:
a controller configured to control a dummy light using an optical intensity of a wavelength-multiplexed optical signal at a wavelength spacing and a threshold value in a wavelength band corresponding to the optical intensity; and
a storage configured to store the threshold value assigned to the wavelength band,
wherein the wavelength spacing is less than the wavelength band.

2. The optical signal control apparatus according to claim 1, wherein the controller is configured to determine the optical intensity of the wavelength-multiplexed optical signal with respect to each wavelength spacing into which the wavelength band is finely divided in accordance with a grid width of an optical signal to control the dummy light.

3. The optical signal control apparatus according to claim 1, wherein the controller is configured to control to introduce the dummy light into the wavelength band according to the optical intensity.

4. The optical signal control apparatus according to claim 3, wherein the controller is configured to determine, if each optical intensity in a predetermined wavelength band is smaller than the threshold value assigned to the predetermined wavelength band, that the dummy light needs introducing into the predetermined wavelength band.

5. The optical signal control apparatus according to claim 3, wherein the controller is configured to determine, if at least one optical intensity in a predetermined wavelength band is equal to or larger than the threshold value assigned to the predetermined wavelength band, that the dummy light does not need introducing into the predetermined wavelength band.

6. The optical signal control apparatus according to claim 1, wherein the wavelength-multiplexed optical signal comprises optical signals in which a plurality of frequency grids are mixed.

7. An optical signal controlling method, comprising:
controlling a dummy light using an optical intensity of a wavelength-multiplexed optical signal at a wavelength spacing and a threshold value in a wavelength band corresponding to the optical intensity; and
storing the threshold value assigned to the wavelength band,
wherein the wavelength spacing is less than the wavelength band.

8. The optical signal controlling method according to claim 7, wherein the controlling of the dummy light includes determining the optical intensity of the wavelength-multiplexed optical signal with respect to each wavelength spacing into which the wavelength band is finely divided in accordance with a grid width of an optical signal to control the dummy light.

9. The optical signal controlling method according to claim 7, wherein the controlling of the dummy light includes controlling to introduce the dummy light into the wavelength band according to the optical intensity.

10. The optical signal controlling method according to claim 9, wherein the controlling of the dummy light includes determining, if each optical intensity in a predetermined wavelength band is smaller than the threshold value assigned to the predetermined wavelength band, that the dummy light needs introducing into the predetermined wavelength band.

11. The optical signal controlling method according to claim 9, wherein the controlling of the dummy light includes determining, if at least one optical intensity in a predetermined wavelength band is equal to or larger than the threshold value assigned to the predetermined wavelength band, that the dummy light does not need introducing into the predetermined wavelength band.

12. The optical signal controlling method according to claim 7, wherein the wavelength-multiplexed optical signal comprises optical signals in which a plurality of frequency grids are mixed.

* * * * *